United States Patent [19]

Morimoto et al.

[11] Patent Number: 4,948,670

[45] Date of Patent: Aug. 14, 1990

[54] VINYL CHLORIDE RESIN COMPOSITION FOR COATING ELECTRIC WIRES

[75] Inventors: Seiichi Morimoto; Kazuyuki Shiji, both of Nagoya; Hisahiro Kusu, Kuwana, all of Japan

[73] Assignee: Mitsubishi Kasei Vinyl Company, Tokyo, Japan

[21] Appl. No.: 332,434

[22] Filed: Mar. 31, 1989

Related U.S. Application Data

[63] Continuation of Ser. No. 183,745, filed as PCT JP86/00426 on Aug. 19, 1986 published as WO88/01429 on Feb. 25, 1988, abandoned.

[51] Int. Cl.$^5$ .............................................. B32B 15/00
[52] U.S. Cl. .................................... 428/379; 428/394; 524/293; 524/299
[58] Field of Search ................. 524/293, 299; 428/379, 428/394

[56] References Cited

U.S. PATENT DOCUMENTS 3,654,211  4/1972  Lutz ..................................... 524/293
4,227,042  10/1980  Lueddecke .......................... 524/293
4,400,429  8/1983  Barlow et al. ....................... 524/293

FOREIGN PATENT DOCUMENTS 3337880  2/1984  Fed. Rep. of Germany ...... 524/293

Primary Examiner—Joseph L. Schofer
Assistant Examiner—Peter D. Mulcahy
Attorney, Agent, or Firm—Oblon, Spivak, McClelland, Maier & Neustadt

[57] ABSTRACT

A vinyl chloride resin composition for coating electric wires, which comprises 100 parts by weight of a vinyl chloride resin and from 10 to 200 parts by weight of an alkyl biphenyltetracarboxylate.

6 Claims, 1 Drawing Sheet

VINYL CHLORIDE RESIN COMPOSITION FOR COATING ELECTRIC WIRES

This application is a continuation of application Ser. No. 07/183,745 filed as PCT JP86/00426 on Aug. 19, 1986 published as WO88/01429 on Feb. 25, 1988, now abandoned.

FIELD OF THE ART:

The present invention relates to a vinyl chloride resin composition for coating electric wires, which is suitable for use as a coating material for electric wires to be used at places where the ambient temperature is high, such as internal wirings of electric or electronic appliances, connecting wirings, various power cables or wirings in automobile engine rooms, or as a coating material for electric wires, the core wire temperature of which is likely to be raised considerably by the application of electric current.

BACKGROUND OF THE INVENTION:

Vinyl chloride resin compositions are widely used as coating materials for electric wires for the wirings in various electric or electronic appliances or in automobiles. Reflecting the improvement in the performance of such appliances and the trend for compact structures in recent years, the coating film is often required to be thin, and consequently vinyl chloride resin compositions are required to have higher heat resistance than before.

When heat resistance is required, it is common to employ a plasticizer having a relatively large molecular weight such as a trimellitic acid ester, a liquid polyester or a dipentaerythritol ester, as the plasticizer for a vinyl chloride resin. However, no adequate heat resistance has been obtained with these plasticizers. For instance, in the case of the trimellitic acid ester which is most popular as a plasticizer for heat resistance, a trialkyl ester wherein the alkyl group has from 9 to 11 carbon atoms (hereinafter sometimes referred to simply as $C_9$–$C_{11}$), is regarded to provide the highest heat resistance, taking the compatibility with a vinyl chloride resin into accounts. However, even then, there still remains a certain misgiving about the heat resistance when the coating film is thinner than 0.8 mm although it exhibits adequate performance as a plasticizer for a coating composition for so-called 105° C. wires i.e. electric wires having a coating film thickness of about 0.8 mm and a heat resistance at a temperature of 105° C. Namely, it has been regarded as unsuitable for wires required to have heat resistance at a higher temperature, such as 125° C. wires. As a polyester plasticizer, a polyester having a molecular weight of from 2000 to 8000 is practically used. However, this is also limited to a heat resistance level for 105° C. wires. Further, in a certain limited field, a dipentaerythritol ester is practically used as a plasticizer having higher heat resistance than the above-mentioned plasticizers. However, this ester is inferior in the compatibility with a vinyl chloride resin, and it brings about a difficulty in the processability. Thus, it has a drawback that it can not meet the requirements for slender wires or thin coatings. Further, the thermal aging resistance is inadequate.

DISCLOSURE OF THE INVENTION:

Under the circumstances, the present inventors have conducted extensive studies on plasticizers for vinyl chloride resins with an aim to provide a coating material for electric wires, which has adequate heat resistance at a temperature of at least 105° C. and excellent thermal aging resistance and which is capable of providing a thin coating for slender wires, and they have finally found that alkyl biphenyltetracarboxylates are effective for this purpose. The present invention has been accomplished on the basis of this discovery.

Namely, it is an object of the present invention to provide a vinyl chloride resin composition for coating electric wires, which is superior in the heat resistance and thermal aging resistance and has excellent processability.

The present invention provides a vinyl chloride resin composition for coating electric wires, which comprises 100 parts by weight of a vinyl chloride resin and from 10 to 200 parts by weight of an alkyl biphenyltetracarboxylate.

BRIEF DESCRIPTION OF THE DRAWINGS:

FIGURE is a graph showing the relationship between the dipping time in warm water of 80° C. and the volume resistivity with respect to vinyl chloride resin compositions obtained in an Example of the present invention and in a Comparative Example.

Figure 1:
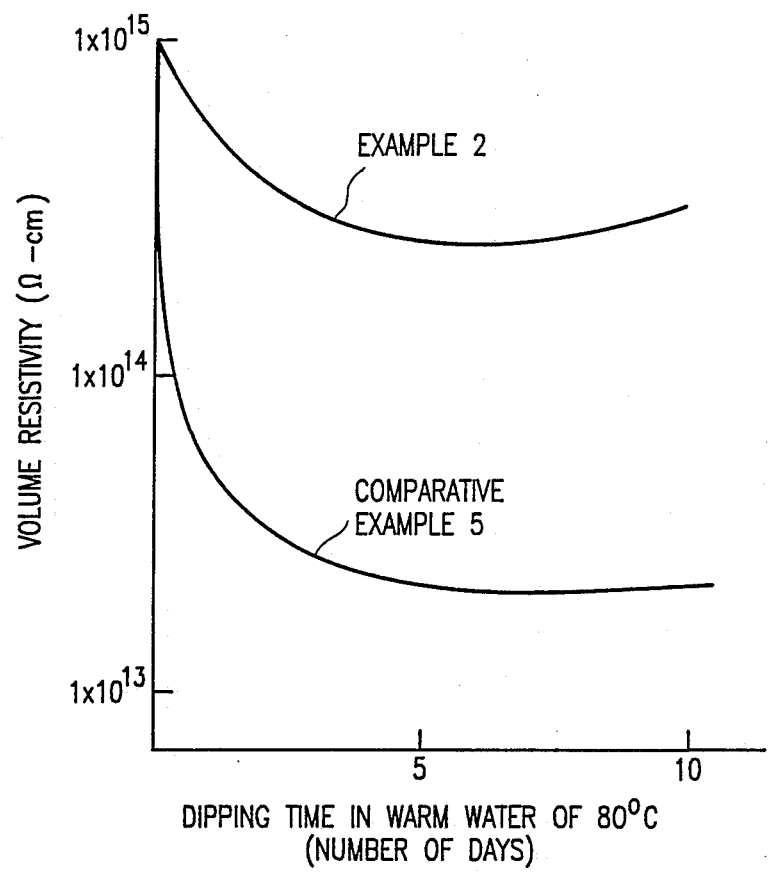

BEST MODES FOR PRACTICE OF THE INVENTION:

The vinyl chloride resin to be employed for the composition of the present invention, includes all the resins prepared by polymerizing vinyl chloride or a mixture of vinyl chloride with a copolymerizable comonomer by various conventional methods such as suspension polymerization, bulk polymerization, fine suspension polymerization and emulsion polymerization. The average degree of polymerization is preferably within a range of from 700 to 10,000, more preferably from 1,100 to 10,000. As the comonomer copolymerizable with vinyl chloride, there may be mentioned a vinyl ester such as vinyl acetate, vinyl propionate or vinyl laurate; an acrylic acid ester such as methyl acrylate, ethyl acrylate or butyl acrylate; methacrylic acid ester such as methyl methacrylate or ethyl methacrylate; a maleic acid ester such as dibutyl maleate or diethyl maleate; a fumaric acid ester such as dibutyl fumarate or diethyl fumarate; a vinyl ether such as vinyl methyl ether, vinyl butyl ether or vinyl octyl ether; a vinyl cyanide such as acrylonitrile or methacrylonitrile; an α-olefin such as ethylene, propylene or styrene; and a vinylidene halide or a vinyl halide other than vinyl chloride, such as vinylidene chloride or vinyl bromide. The comonomer is used usually in an amount of not more than 30% by weight, preferably not more than 20% by weight, of the constituents of the vinyl chloride resin. Of course, the comonomer is not limited to the above-mentioned specific examples.

The alkyl biphenyltetracarboxylate plasticizer to be employed for the composition of the present invention, is preferably the one represented by the formula:

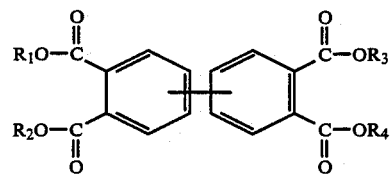

wherein each of $R_1$, $R_2$, $R_3$ and $R_4$ which may be the same or different, represents an alkyl group which may have a branched chain.

The alkyl group for each of $R_1$, $R_2$, $R_3$ and $R_4$ preferably has from 4 to 13 carbon atoms.

Specific examples of such an alkyl biphenyltetracarboxylate include tetrabutyl 2,3,3',4'- or 3,4,3',4'-biphenyltetracarboxylate, tetrapentyl 2,3,3',4'- or 3,4,3', 4'-biphenyltetracarboxylate, tetrahexyl 2,3,3', 4'- or 3,3',4,4'-biphenyltetracarboxylate, tetraheptyl 2,3,3',4'- or 3,4,3',4'-biphenyltetracarboxylate, tetra(2-methylhexyl) 2,3,3',4'- or 3,4,3',4'-biphenyltetracarboxylate, tetra(n-octyl) 2,3,3',4'- or 3,4,3',4'-biphenyltetracarboxylate, tetra(2-ethylhexyl) 2,3,3',4'- or 3,4,3',4'-biphenyltetracarboxylate, tetraisooctyl 2,3,3',4'- or 3,4,3',4'-biphenyltetracarboxylate, tetranonyl 2,3,3',4'- or 3,4,3',4'-biphenyltetracarboxylate, tetradecyl 2,3,3',4'- or 3,4,3',4'-biphenyltetracarboxylate, tetraundecyl 2,3,3',4'- or 3,4,3',4'-biphenyltetracarboxylate, tetradodecyl 2,3,3',4'- or 3,4,3',4'-biphenyltetracarboxylate and tetra(mixed oxoalcohol)ester of 2,3,3',4'- or 3,4,3',4'-biphenyltetracarboxylic acid. These plasticizers can be produced by a conventional esterification method in the presence or absence of a solvent and in the presence of an esterification catalyst by reacting 2,3,3',4'-biphenyltetracarboxylic acid or 3,4,3',4'-biphenyltetracarboxylic acid with an alcohol having from 4 to 13 carbon atoms to obtain a 2,3,3',4'-tetracarboxylate or a 3,4,3',4'-tetracarboxylate, respectively. The alcohol used for the esterification reaction of the biphenyltetracarboxylic acid, includes butanol, pentanol, hexanol, heptanol, 2-methylhexanol, octanol, 2-ethylhexanol, isooctanol, nonanol, decanol, isodecanol, undecanol, dodecanol, a mixture of these alcohols, and a $C_7$–$C_8$, $C_7$–$C_9$ or $C_9$–$C_{11}$ oxoalcohol mixture obtained by an oxo reaction using an $\alpha$-olefin as the main material. Of course, depending upon the amount of the alcohol or the esterification condition, a monoester, a diester or triester will also be formed. The plasticizer used for the composition of the present invention may contain such esters.

The alkyl biphenyltetracarboxylate is used usually in an amount of from 10 to 200 parts by weight relative to 100 parts by weight of the vinyl chloride resin. When the alkyl biphenyltetracarboxylate is used alone as a plasticizer without using other plasticizers mentioned hereinafter, it is preferably used in an amount of at least 20 parts by weight. If the amount is less than 10 parts by weight, the resulting composition, while durable for 105° C. wires, is not fully satisfactory as a coating material for electric wires required to have heat resistance at a temperature of 125° C. (i.e. 125° C. wires), which are likely to be heated at a higher temperature. On the other hand, if the amount exceeds 200 parts by weight, the heat deformation of the resulting composition tends to be too much as a vinyl chloride resin composition for coating electric wires, and there will be an economical disadvantage, although the processability will be improved.

In the vinyl chloride resin composition for coating electric wires according to the present invention, plasticizers commonly employed in vinyl chloride resins may be used in combination with the alkyl biphenyltetracarboxylate as the plasticizer. The plasticizers which may be used in combination, include a phthalate plasticizer such as di-n-butyl phthalate, di-n-octyl phthalate, di-2-ethylhexyl phthalate, diisooctyl phthalate, octyldecyl phthalate, diisodecyl phthalate, butylbenzyl phthalate, di-2-ethylhexyl isophthalate or a phthalic acid ester of a higher alcohol having from 11 to 13 carbon atoms; a trimellitate plasticizer such as n-octyl-n-decyl trimellitate, tri-2-ethylhexyl trimellitate, triisodecyl trimellitate or tri-n-octyl trimellitate; a fatty acid ester plasticizer such as di-2-ethylhexyl adipate, di-n-decyl adipate, diisodecyl adipate, di-2-ethylhexyl azelate, dibutyl sebacate or di-2-ethylhexyl sebacate; a phosphate plasticizer such as tributyl phosphate, tri-2-ethylhexyl phosphate, 2-ethylhexyldiphenyl phosphate or tricresyl phosphate; an epoxy plasticizer such as epoxidized soybean oil, epoxidized linseed oil or epoxidized tall oil fatty acid 2-ethylhexyl ester; and liquid epoxy resin. When these plasticizers are incorporated in combination, the total amount of the plasticizers is preferably from 20 to 200 parts by weight relative to 100 parts by weight of the vinyl chloride resin in view of the heat resistance, aging resistance and processability. Further, it is preferred that the alkyl biphenyltetracarboxylate is contained in an amount of at least 50% by weight of the total amount of the plasticizers.

In addition to the above-mentioned essential components, additives which are commonly employed in vinyl chloride resins, such as a stabilizer, a lubricant, a flame retardant, an antioxidant, a ultraviolet absorber, a filler, a coloring agent, a releasing agent, etc. may be incorporated, in many cases, to the vinyl chloride resin composition for coating electric wires according to the present invention. Further, if necessary, a chelating agent, a crosslinking agent or a crosslinking assistant may also be incorporated.

As the stabilizer, a tribasic lead sulfate, a dibasic lead phthalate, a lead orthosilicate-silica gel coprecipitate, a dibasic lead stearate, a cadmium-barium stabilizer, a barium-zinc stabilizer, a calcium-zinc stabilizer or a tin stabilizer, may be used. Further, a stabilizer composed mainly of a salt of metal such as magnesium, aluminum or silcon, may also be employed. The stabilizer is used preferably within a range of from 0.1 to 10 parts by weight, more preferably from 1 to 5 parts by weight, relative to 100 parts by weight of the vinyl chloride resin.

As the lubricant, a higher fatty acid or its metal salt, various parafins, a higher alcohol, a natural wax, a polyethylene wax, a fatty acid ester or a fatty acid amide, may be employed.

As the filler, calcium carbonate, clay, talc, silica fine powder or aluminum hydroxide, may be employed.

As the flame retardant, antimony trioxide, barium borate, zinc borate, zinc oxide, polyethylene chloride or other halogen flame retardants, may be employed.

The vinyl chloride resin composition for coating electric wires according to the present invention, may be prepared by uniformly mixing the vinyl chloride resin and the alkyl biphenyltetracarboxylate, and if necessary, the above-mentioned other additives. For instance, a mixture of such components is uniformly dispersed by e.g. a ribbon blender, a cake mixer, a crusher or a high speed mixer to obtain a composition. Further, this composition may further be kneaded by means of a mill rolls, a Bunbury mixer, a press kneader, a single screw extruder, a double screw extruder, a plastificator or a cokneader. A sheet or strand obtained by kneading may be cooled and then pelletized to obtain a composition in the form of pellets.

The composition thus prepared may be coated on bare electric wires or precoated electric wires by a usual manner, for instance, by extrusion coating by means of an extruder, to obtain electric wires coated with the vinyl chloride resin composition.

Now, the composition of the present invention will be described in further detail with reference to Examples. However, it should be understood that the present invention is by no means restricted to these specific Examples.

A mixture of the above components was uniformly blended by a high speed stirrer, then kneaded by mill rolls and formed into a sheet. Then, the thermal aging resistance was compared with other heat resistant plasticizers with respect to the tensile strength retention (%), the elongation retention (%) and the weight loss on heating (%).

TABLE 1

|  | Example 1 | Comparative Example 1 | Comparative Example 2 | Comparative Example 2 | Comparative Example 4 |
|---|---|---|---|---|---|
| Plasticizer | Tetraheptyl diphenyltetra- carboxylate *1 | Tri-2-ethylhexyl trimellitate | Tri-n-octyl trimellitate | Adipic acid polyester (Molecular weight 2000) | Dipentaerythritol tetracaproate |
| Thermal aging conditions |  | 158° C. for 168 hrs. |  |  |  |
| Test piece thickness: 1 mm Tensile strength retention (%) | 95 | Not measurable *2 | 90 | 89 | 90 |
| Elongation retention (%) | 80 | Not measurable *2 | 80 | 60 | 70 |
| Weight loss on heating (%) | 2.2 | 11.7 | 6.8 | 9.7 | 5.3 |
| Test piece thickness: 0.2 mm Tensile strength retention (%) | 90 | Not measurable *2 | 78 | 89 | 76 |
| Elongation retention (%) | 70 | Not measurable *2 | 50 | 45 | 50 |
| Weight loss on heating (%) | 2.3 | 20.8 | 10.0 | 9.9 | 5.8 |

*1 Tetraheptyl biphenyltetracarboxylate was prepared by the esterification of biphenyltetracarboxylic acid with C7 alcohol (n/i = 1), tradename Diadol-7, manufactured by Mitsubishi Chemical Industries Limited.
*2 Not measurable: The plasticizer decreased on heating, whereby the sheet became brittle and readily ruptured when subjected to the measurement.

In the Examples, "parts" means "parts by weight".

The methods for evaluation of the compositions in the Examples, are as follows.
(1) Thermal aging resistance, heat deformation resistance, oil resistance and volume resistivity:
In accordance with JIS K 6723.
(2) Processability:
The blend composition was introduced into a Brabender Plastograph and kneaded at a cell temperature of 180° C. at 70 RPM, whereby the processability was evaluated by the time required to reach the maximum torque value.
(3) Physical properties of the electric wire coating insulator:
With respect to the insulator obtained by removing the conductor, the physical properties were measured in accordance with UL758 standards.

EXAMPLE 1 and COMPARATIVE EXAMPLES 1 to 4

| Vinyl chloride resin (average degree of polymerization p: 2500) | 100 parts |
|---|---|
| Stabilizer: Dibasic lead phthalate (DLF) | 5 parts |
| Tribasic lead sulfate (TS-GM) | 5 parts |
| Antioxidant: Bisphenol A | 0.5 part |
| Filler: Clay | 8 parts |
| Flame retardant: Antimony trioxide | 5 parts |
| Plasticizer: As disclosed in Table 1 | 50 parts |

As is evident from Table 1, when tetraheptyl biphenyltetracarboxylate is used, the weight loss on heating at a high temperature for a long period of time is substantially small as compared with other heat resistant plasticizers. Particularly when the thickness is thin, the reduction rate of the strength is small, thus indicating that the composition of the present invention is useful as a coating material for a thin coating of electric wires.

EXAMPLES 2 to 5 and COMPARATIVE EXAMPLES 5 to 7

A vinyl chloride resin composition was prepared in the same manner as in Example 1 except that the polymerization degree of the vinyl chloride resin and the type and the amount of the plasticizer in Example 1, were changed as shown in Table 2, and the thermal aging resistance, oil resistance, heat deformation resistance, volume resistivity and processability were measured and shown in Table 2.

Further, the changes in the insulation resistance in the warm water dipping test with respect to the compositions obtained in Example 2 and Comparative Example 5, are shown in FIG. 1. In the Figure, the ordinate indicates the volume resistivity and the abscissa indicates the number of days for dipping in warm water at 80° C. The resistivity was measured at 30° C.

TABLE 2

|  |  | Example 2 | Comparative Example 5 | Comparative Example 6 | Example 3 | Comparative Example 7 | Example 4 | Example 5 |
| --- | --- | --- | --- | --- | --- | --- | --- | --- |
| Vinyl chloride resin | p 4000 | 100 | 100 | 100 |  |  |  |  |
|  | p 9000 |  |  |  | 100 | 100 | 100 | 100 |
| Plasticizer | Heptyl biphenyltetra-carboxylate *1 | 60 |  |  | 80 |  |  |  |
|  | $C_9$, $C_{11}$ alcohol ester of biphenyl-tetracarboxylic acid *2 |  |  |  |  |  | 80 |  |
|  | Isononyl biphenyl-tetracarboxylate *3 |  |  |  |  |  |  | 80 |
|  | n-Octyl trimellitate |  | 60 |  |  |  |  |  |
|  | Dipentaerythritol caproate |  |  | 60 |  | 80 |  |  |
| Thermal aging resistance (Thickness: 1 mm) 158° C. for 168 hrs. | Tensile strength retention (%) | 98 | 92 | 98 | 100 | Not processable | 100 | 100 |
|  | Elongation retention (%) | 95 | 83 | 80 | 100 |  | 100 | 100 |
| Oil resistance (thickness: 1 mm) 100° C. for 96 hrs. | Tensile strength retention (%) | 95 | 93 | 107 | 99 | Not measurable | 97 | 99 |
|  | Elongation retention (%) | 85 | 81 | 16 | 90 |  | 90 | 89 |
| Heat deformation resistance (thickness: 2 mm) 158° C. under 2 kg for 1 hr. (%) |  | 2.5 | 11.0 | 9.0 | 5.4 |  | 5.6 | 5.5 |
| Volume resistivity at 30° C. (Ω-cm) |  | $1 \times 10^{15}$ | $1 \times 10^{15}$ | $1 \times 10^{15}$ | $9.7 \times 10^{13}$ |  | $8.0 \times 10^{13}$ | $9.4 \times 10^{13}$ |
| Volume resistivity at 30° C. after dipping in warm water at 80° C. for 10 days (Ω-cm) |  | $3.2 \times 10^{14}$ | $2.2 \times 10^{13}$ | $2.0 \times 10^{13}$ | $6.0 \times 10^{13}$ |  |  |  |
| Processability (min.) |  | 1.2 | 2.0 | 2.3 |  |  |  |  |

*1 Same as used in Example 1
*2 $C_9$, $C_{11}$ alcohol esters of biphenyltetracarboxylic acid was prepared by the esterification of biphenyltetracarboxylic acid with $C_9$, $C_{11}$ alcohol mixture ($C_9/C_{11} = 1$), tradename Diadol-911, manufactured by Mitsubishi Chemical Industries Limited
*3 Isononyl biphenyltetracarboxylate was prepared by the esterification of biphenyltetracarboxylic acid with isononyl alcohol, tradename OXO-900, manufactured by Nissan Chemical Industries Ltd.

As is evident from Table 2, the compositions of the present invention are superior to the conventional heat resistant plasticizers in each of the aging resistance, the oil resistance, the heat deformation resistance and the volume resistivity. Further, from the results of FIG. 1, it is evident that even when dipped in warm water, the reduction of the insulation properties is minimum, thus indicating that the resin composition of the present invention is useful as a vinyl chloride resin for coating electric wires.

EXAMPLES 6 to 8 and COMPARATIVE EXAMPLES 8 to 10

The vinyl chloride resin composition of each of Examples 3, 4 and 5 and Comparative Examples 2, 5 and 7, was extrusion-coated on an electric wire conductor having an outer diameter of 0.8 mm in a thickness of 0.4 mm to obtain a coated electric wire having an outer diameter of 1.6 mm. The conductor was removed, and the thermal aging resistance and heat deformation rate of the insulator were measured and shown in Table 3.

TABLE 3

|  | Example | | | Comparative Example | | |
| --- | --- | --- | --- | --- | --- | --- |
|  | 6 | 7 | 8 | 8 | 9 | 10 |
| Coating composition | Example 3 | Example 4 | Example 5 | Comparative Example 2 | Comparative Example 5 | Comparative Example 7 |
| Thermal aging resistance: Elongation retention (%) 158° C. for 168 hrs. | 96 | 98 | 97 | 50 | 60 | Extrusion coating impossible |
| Heat deformation resistance: deformation rate (%) | | | | | | |
| 158° C. for 1 hr. 250 g | 7 | 6.5 | 6.5 | 30 | 30 | |
| 158° C. for 1 hr. 500 g | 17 | 16 | 16 | 50 | 50 | |

It is evident from the results of Table 3 that (1) the compositions of the present invention have adequate properties required for 125° C. wires (such as the thermal aging resistance (158° C. for 168 hrs.): an elongation retention of at least 65%, and the heat deformation resistance (158° C. for 1 hr. under 250 g): a deformation rate of not higher than 50%), (2) the compositions of the Comparative Examples are useful as coating materials for 105° C. wires, but they are inferior in the aging resistance at a high temperature and not suitable for use for 125° C. wires, and (3) in Comparative Example 10, the extrusion coating was impossible, indicating that the composition is not useful for electric wires where a thin coating is required.

INDUSTRIAL APPLICABILITY

The vinyl chloride resin composition for coating electric wires, which contains an alkyl biphenyltetracarboxylate as a plasticizer according to the present invention, has excellent thermal aging resistance, heat deformation resistance, oil resistance and volume resistivity. It is particularly superior in the volume resistivity after dipping it in a high temperature water for a long period of time, as compared with a composition containing other plasticizers for heat resistance. Further, the molding processability of the composition is good.

Thus, the composition of the present invention not only is useful for 105° C. wires, but also exhibits remarkable performance as a coating material for insulation of 125° C. wires which are required to have higher heat resistance. Accordingly, its industrial value for practical application is significant.

I claim:

1. An electric wire coated with a vinyl chloride resin composition, the coating being thinner than 0.8 mm, said composition comprising 100 parts by weight of a vinyl chloride resin and from 10 to 200 parts of an alkyl biphenyltetracarboxylate, the coating having adequate heat resistance at a temperature of at least 105° C.

2. The electric wire according to claim 1, wherein the alkyl biphenyltetracarboxylate is represented by the formula:

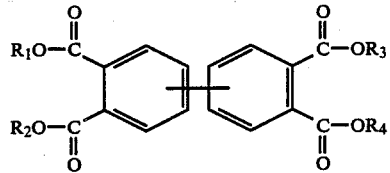

wherein each of $R_1$, $R_2$, $R_3$ and $R_4$ which may be the same or different, represents an alkyl group having from 4 to 13 carbon atoms.

3. The electric wire according to claim 1, wherein the alkyl biphenyltetracarboxylate is a $C_7$ alkyl biphenyltetracarboxylate.

4. The electric wire according to claim 1, wherein the alkyl biphenyltetracarboxylate is a $C_9$ alkyl biphenyltetracarboxylate.

5. The electric wire according to claim 1, wherein the alkyl biphenyltetracarboxylate is a $C_7$–$C_9$ alkyl biphenyltetracarboxylate.

6. The electric wire according to claim 1, wherein the alkyl biphenyltetracarboxylate is a $C_9$–$C_{11}$ alkyl biphenyltetracarboxylate.

* * * * *